(12) United States Patent
Margiott

(10) Patent No.: US 6,472,095 B2
(45) Date of Patent: Oct. 29, 2002

(54) HYBRID FUEL CELL REACTANT FLOW FIELDS

(75) Inventor: Paul R. Margiott, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 64 days.

(21) Appl. No.: 09/751,591

(22) Filed: Dec. 29, 2000

(65) Prior Publication Data

US 2002/0086200 A1 Jul. 4, 2002

(51) Int. Cl.[7] .............................. H01M 2/02; H01M 2/14
(52) U.S. Cl. ............................... 429/34; 429/38; 429/39
(58) Field of Search .................... 429/34, 38, 39

(56) References Cited

U.S. PATENT DOCUMENTS

| | | | | |
|---|---|---|---|---|
| 4,973,530 A | * | 11/1990 | Vanderborgh et al. | 429/13 |
| 4,988,583 A | * | 1/1991 | Watkins et al. | 429/30 |
| 5,641,586 A | * | 6/1997 | Wilson | 429/30 |
| 5,686,199 A | * | 11/1997 | Cavalca et al. | 429/30 |
| 6,106,964 A | * | 8/2000 | Voss et al. | 429/13 |
| 6,146,780 A | * | 11/2000 | Cisar et al. | 429/210 |
| 6,159,629 A | * | 12/2000 | Gibb et al. | 429/34 |
| 6,207,312 B1 | * | 3/2001 | Wynne et al. | 429/13 |
| 6,284,206 B1 | * | 9/2001 | Lesieur et al. | 165/138 |
| 6,303,245 B1 | * | 10/2001 | Nelson | 429/34 |

FOREIGN PATENT DOCUMENTS

WO  WO 99/67845  * 12/1999 ............ H01M/8/02

OTHER PUBLICATIONS

Nguyen, Trung V. et. al. "Effect of direct liquid water injection and interdigitated flow field on the performance of proton exchange membrane fuel cells" Electrochima Acta, vol. 43, No. 24, pp. 3795–3809, 1998.*

* cited by examiner

Primary Examiner—Carol Chaney
Assistant Examiner—Donald V. Scaltrito
(74) Attorney, Agent, or Firm—M. P. Williams

(57) ABSTRACT

A fuel cell reactant flow field (16) has flow-through channels (18) joined by an interface (26) with interdigitated flow channels (21, 22). The interface may be defined by a flow reversing manifold (35) or may exist between flow reversing manifolds (43, 48), remotely thereof.

8 Claims, 3 Drawing Sheets

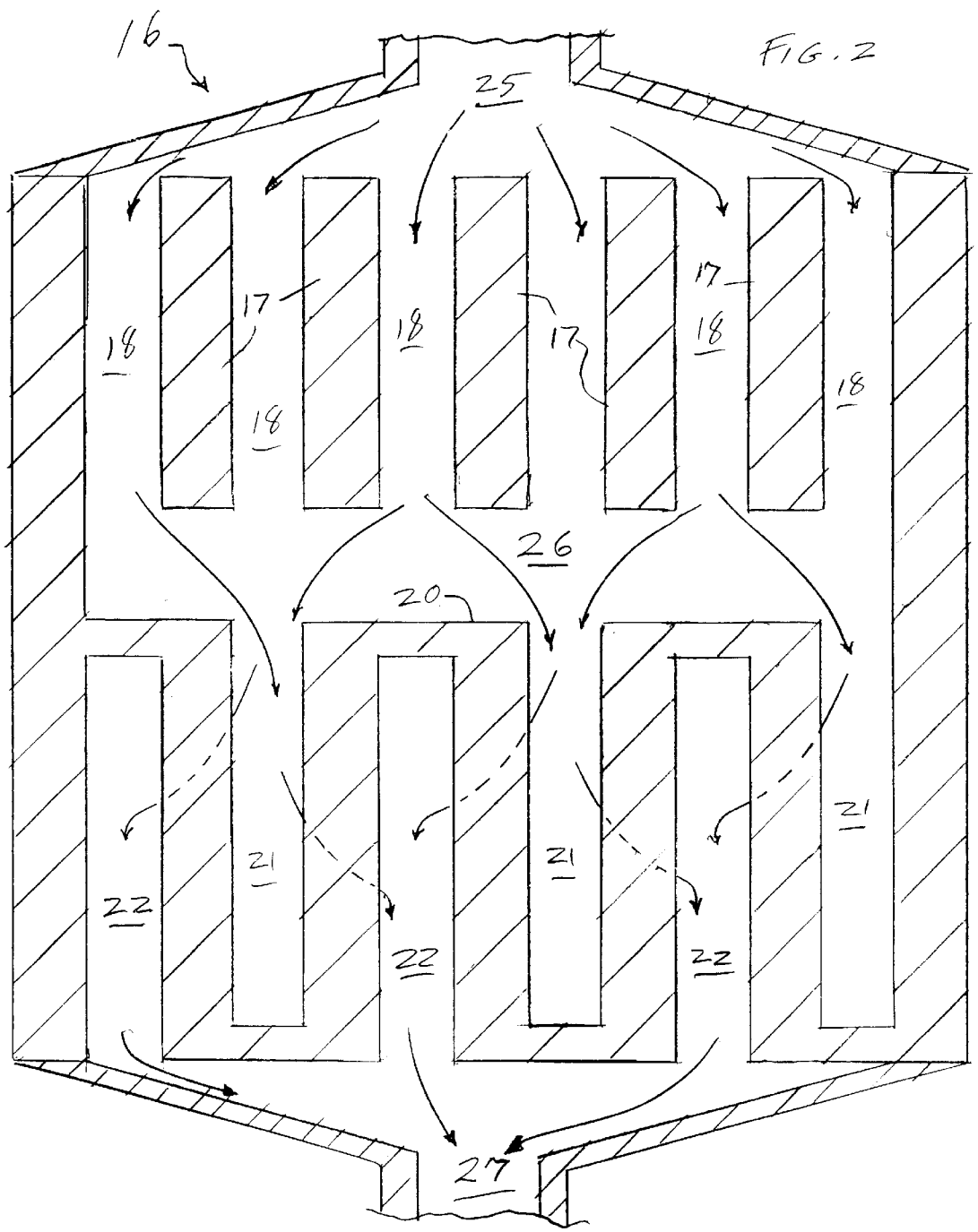

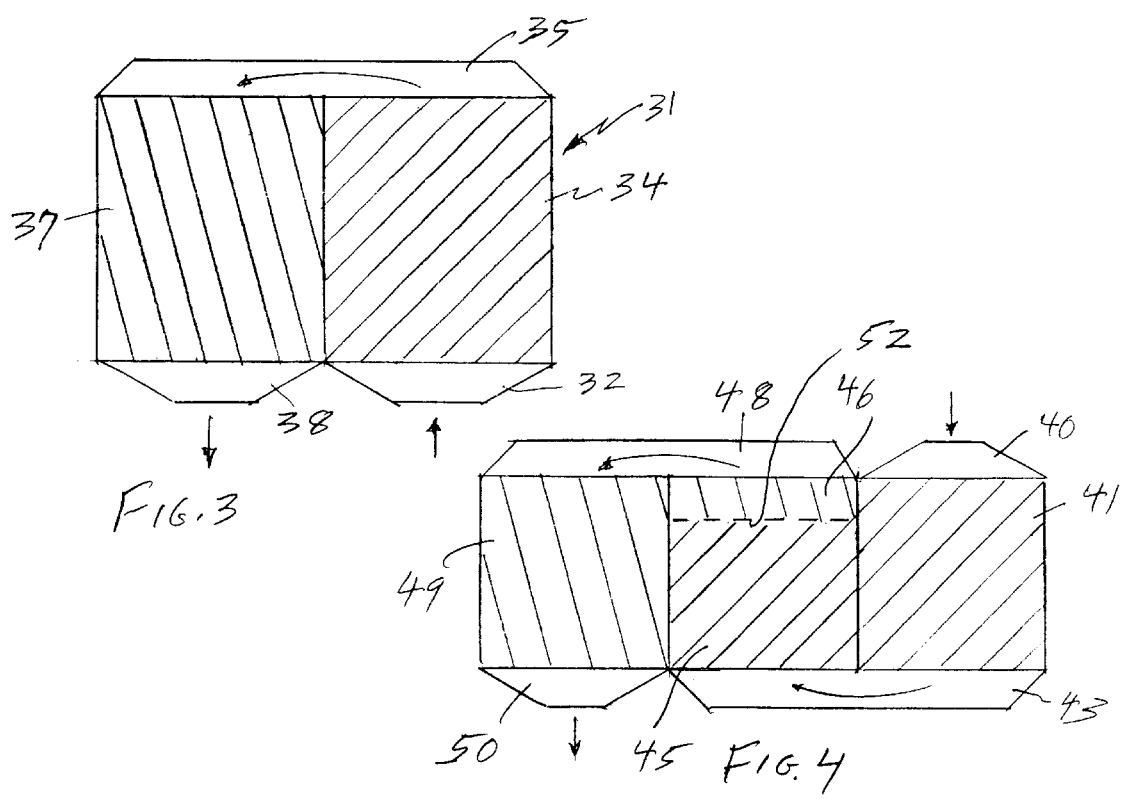

HYBRID FUEL CELL REACTANT FLOW FIELDS

TECHNICAL FIELD

This invention relates to reactant flow fields in a fuel cell having partly low pressure flow through reactant flow field channels and partly interdigitated flow field channels.

BACKGROUND ART

The electrochemical reactions in fuel cells are well known. The reactants in alkaline, acid, or solid polymer electrolyte fuel cells are hydrogen or a hydrogen rich fuel at the anode, and an oxygen or air oxidant at the cathode. It is known to use interdigitated reactant flow fields to minimize concentration polarization within fuel cells operating with dilute reactants.

Interdigitated reactant flow fields, in which entrance gas flow channels do not directly connect to exit gas flow channels, thereby force the reactant gas to flow into an adjacent layer of the fuel cell. This results in forced convection of the reactant toward the electro catalyst so that a greater proportion of the reactant flowing through the reactant flow fields is utilized more efficiently. However, the forced convection cannot be achieved effectively without an increase in the pressure drop across the flow field. The increased pressure drop, in turn, requires a higher pressurization of the reactant gas, thereby consuming a greater proportion of the electricity which is generated by the fuel cell, which is called parasitic power. The suitability of fuel cells for any particular utilization is at least partly dependent upon its overall efficiency, including not only the efficiency of generating the electricity, but the cost (in power) of generating that electricity. Thus, the overall efficiency of the fuel cell is of paramount importance, particularly in mobile equipment, such as vehicles, which not only must transport a load, and the fuel cell, but also the fuel which is to be utilized, in one form or another.

DISCLOSE OF INVENTION

Objects of the invention include provision of fuel cells which take advantage of the reactant utilization obtainable with interdigitated reactant flow fields without requiring prohibitive parasitic power resulting from the need for increased pressure.

This invention is predicated on the discovery that the reactant utilization advantage of interdigitated flow fields is not necessary when the reactant concentration has been depleted only slightly, but rather the advantage of interdigitated flow fields becomes operative part way through the reactant flow field, when the reactant concentration has been significantly depleted. The invention is further predicated on the discovery that the reduction in reactant concentration utilizing a reactant flow field which is only partially interdigitated can be substantially the same as the reactant concentration in which the entire reactant flow field is interdigitated, while at the same time decreasing by approximately one-half the pressure necessary to effect such reactant utilization.

According to the present invention, the reactant flow field of a fuel cell is configured partly with flow-through flow channels and partly configured with interdigitated flow channels. According to the invention further, the flow-through flow channels are upstream of the interdigitated flow channels. The hybrid flow channels may be implemented in a straight flow field or a flow field which is folded one or more times. The junction between flow-through flow field channels and interdigitated flow field channels may be adjacent to a manifold, or may be intermediate the manifolds.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a stylized, simplified sectioned side elevation view of a hybrid reactant flow field according to the present invention.

FIG. 3 is a simplified schematic illustration of a folded reactant flow field according to the present invention.

FIG. 4 is a simplified schematic illustration of a three-fold reactant flow field with the transition between flow-through flow field channels and interdigitated flow field channels being remote from a flow manifold.

MODE(s) FOR CARRYING OUT OF INVENTION

Figure 1:
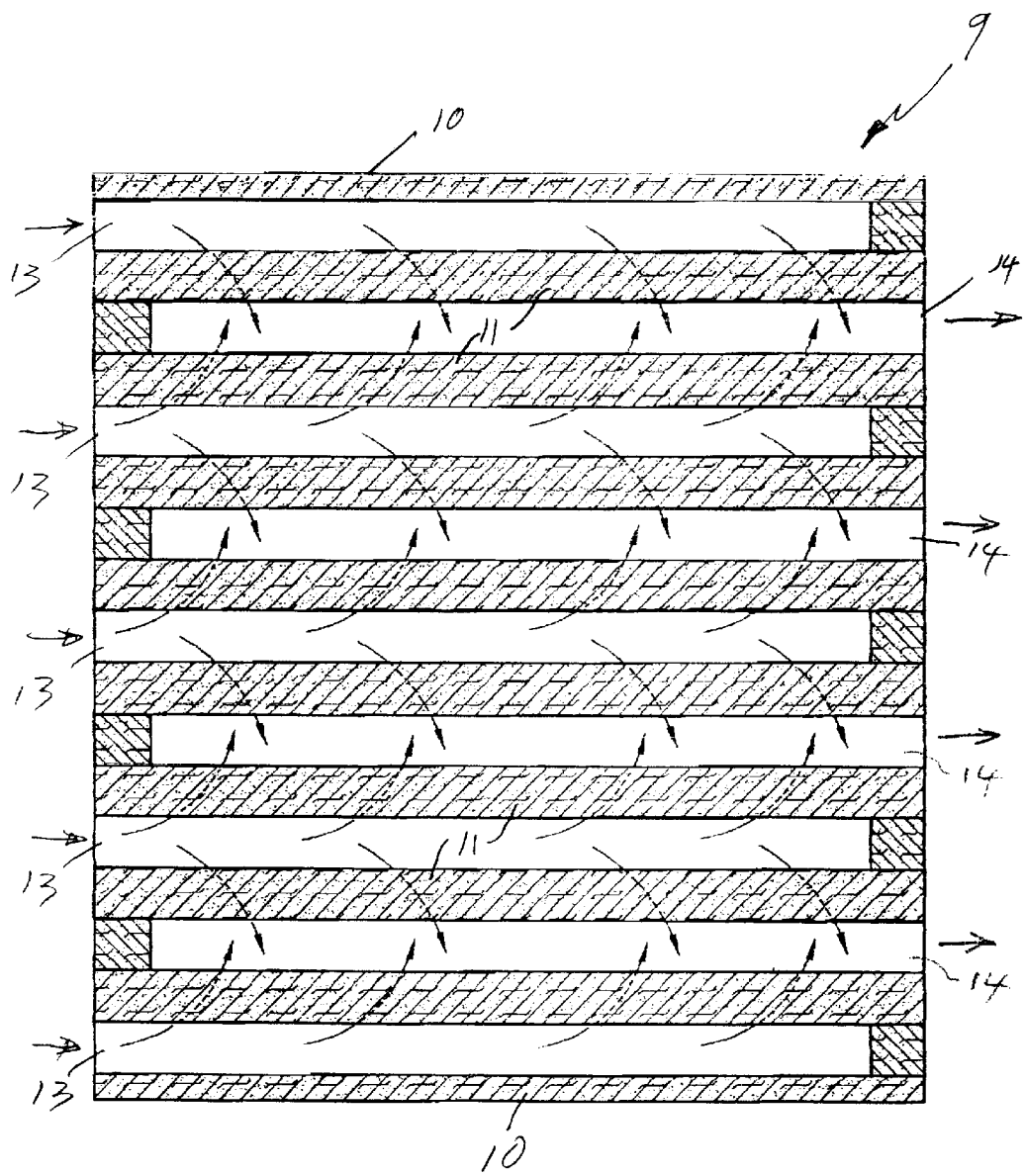
FIG. 1 is a simplified, sectioned, side elevation view of a conventional interdigitated fuel cell reactant flow field.

FIG. 1 is a simplified illustration of a conventional interdigitated flow field as is illustrated and described more fully in commonly owned, copending U.S. patent application Ser. No. 09/542,718 filed on Apr. 4, 2000. As illustrated, the flow field plate 9 has end ridges 10 and additional ridges 11 which separate the flow field plate 9 into inlet channels 13 and outlet channels 14. The flow, as is shown by the arrows in FIG. 1, is from the inlet channels, beneath the intermediate ribs 11, and then out through the outlet channels 14. The flow field plate 9 is positioned adjacent to an additional, porous plate of the fuel cell, typically a reactant support plate, into which reactant is forced by convection as it flows beneath the intermediate ribs 11. A greater concentration of the reactant gas reaches the adjacent, porous electro catalyst support plate by means of the forced convention created by the interdigitated flow field than is normally achieved simply by diffusion of the gases from flow-through flow field channels.

To achieve lower pressure drops, the present invention comprises a hybrid reactant oxidant flow field configuration illustrated, simplistically, in FIG. 2. The hybrid reactant flow field plate 16 includes ribs 17 that define parallel flow-through flow field channels 18, and a serpentine rib 20 that defines inlet channels 21 and outlet channels 22. Instead of a serpentine rib 20 as shown, other structure (such as that shown in FIG. 1) may be utilized to define the interdigitated flow field channels. For the case where the reactant is air, air entering an inlet manifold 25 will include a substantially normal amount of oxygen (about 21%); however, the oxygen in the air becomes depleted as the air travels along the flow fields and the oxygen diffuses and is consumed by the process. By the time the air reaches a transition 26 between the flow-through flow field channels 18 and the interdigitated channels 21, 22, the air is sufficiently depleted that the interdigitated flow fields will provide a substantial improvement in oxygen concentration, due to the forced convection of the air beneath the serpentine rib 20 into the adjacent electro-catalyst support plate. Then the air flows through the exit channels and an exit manifold 27 to a suitable exhaust, or any form of recovery or reutilization apparatus, as desired. Depending upon all of the other parameters of the fuel cell including its size, its general configuration, the pressures utilized and the pressure drops which are desired, as well as the nature of the pressure-inducing mechanism (such as a fan, a blower or a compressor), the relative balance between flow-through reactant flow field channels and interdigitated flow field channels will be differently determined. The flow-through channels should occupy as great a percentage of the flow path length as is possible without reducing the reactant concentration by more than a few percent, depending upon the design goals in any utilization of the present invention. A balance between the degree of reduction in reactant concentration and the reduction in required pressure drops will be achieved to suit the particular implementation of the invention.

In FIG. 2, the hybrid channel configuration is shown in line, with the transition 26 being approximately mid way through the cell. However, the location of the transition 26 will vary considerably from case to case depending upon other parameters. In FIG. 3, a fuel cell reactant flow field plate 31 is shown in a folded configuration in which the oxidant enters through an inlet manifold 32, passes through a portion 34 of the plate 31 which has flow-through reactant flow field channels, then is turned by a flow reversing manifold 35 so as to flow through a portion 37 of the plate 31 which has interdigitated reactant flow field channels, after which the reactant flows through an exit manifold 38 to exhaust. In FIG. 3, the transition between flow-through and interdigitated channels is defined by the flow reversing manifold 35. However, the transition between the portions 34 and 37 need not occur at the manifold 35, but may be mid-way between the manifold 35 and either of the manifolds 32, 38, as is illustrated in FIG. 4. Therein, the reactant flows through an inlet manifold 40, through a first portion 41 which comprises flow-through reactant flow field channels, through a reversing manifold 43 and a second portion 45 which has flow-through reactant flow field channels, and thence through a portion 46 which has interdigitated reactant flow field channels, through a reversing manifold 48 and a portion 49 which has interdigitated flow field channels, and thence through an exit manifold 50 to exhaust. The transition 52 between the flow-through channels and the interdigitated channels may be located anywhere between the manifolds to suit any utilization of the present invention.

The aforementioned patent application and any continuing U.S. patent application derived therefrom, is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell with a reactant flow field plate comprising:
   a reactant inlet and a reactant outlet;
   a plurality of flow-through reactant flow field channels wherein reactant gas is immediately dispersed from the inlet to flow through the flow-through channels
   a plurality of interdigitated reactant flow field channels; and
   a flow transition for directing flow between said flow-through channels and said interdigitated channels, said channels and said transition extending between said inlet and said outlet.

2. A flow field plate according to claim 1 wherein at least a portion of said flow-through channels are adjacent to said inlet and at least a portion of said interdigitated channels are adjacent to said outlet.

3. A flow field plate according to claim 1 wherein said flow-through channels are disposed upstream of said interdigitated channels.

4. A fuel cell according to claim 1 including a flow reversing manifold, at least a portion of the flow field plate upstream of said flow reversing manifold comprising flow-through reactant flow field channels, and at least a portion of the channels downstream of said flow reversing manifold comprising interdigitated reactant flow field channels.

5. A fuel cell according to claim 1 including a flow reversing manifold, and in which said transition is disposed within the flow emanating from said flow reversing manifold but at a distance from said flow reversing manifold.

6. A fuel cell according to claim 1 which has a plurality of flow reversing manifolds and said transition exists between a pair of said flow reversing manifolds.

7. A fuel cell according to claim 1 having a plurality of flow reversing manifolds and said transition is disposed within the flow emanating from one of said flow reversing manifolds but at a distance from said one flow reversing manifold.

8. A fuel cell according to claim 1 having one or more flow reversing manifolds, and in which said transition is a flow reversing manifold.

* * * * *